(12) United States Patent
Floyd

(10) Patent No.: US 10,667,535 B2
(45) Date of Patent: Jun. 2, 2020

(54) METHODS FOR INHIBITING MOLD GROWTH

(71) Applicant: Emily Elizabeth Floyd, Sunnyvale, CA (US)

(72) Inventor: Emily Elizabeth Floyd, Sunnyvale, CA (US)

(*) Notice: Subject to any disclaimer, the term of this patent is extended or adjusted under 35 U.S.C. 154(b) by 231 days.

(21) Appl. No.: 15/955,677

(22) Filed: Apr. 17, 2018

(65) Prior Publication Data
US 2018/0303107 A1    Oct. 25, 2018

Related U.S. Application Data

(60) Provisional application No. 62/487,479, filed on Apr. 20, 2017.

(51) Int. Cl.
*A23B 7/10* (2006.01)
*A23B 7/154* (2006.01)
*A23L 3/3472* (2006.01)

(52) U.S. Cl.
CPC .............. *A23B 7/10* (2013.01); *A23B 7/154* (2013.01); *A23L 3/3472* (2013.01)

(58) Field of Classification Search
CPC .......... A23B 7/10; A23B 7/154; A23L 3/3472
USPC ........................................ 426/335, 615, 638
See application file for complete search history.

(56) References Cited

U.S. PATENT DOCUMENTS

| | | | |
|---|---|---|---|
| 5,013,574 A * | 5/1991 | Hassel et al. | |
| 5,534,078 A * | 7/1996 | Breunsbach | |
| 6,863,917 B2 * | 3/2005 | Redding, Jr. et al. | |
| 2004/0128908 A1 * | 7/2004 | Neuman | |

OTHER PUBLICATIONS

Gottardi et al. "Beneficial Effects of Spices in Food Preservation and Safely", pp. 1-27, https://www.nebi.nlm.nih.gov/pmc/articles/PMC5030248 (Year: 2016).*
Internet Article by the Clorox Company, "How to Preserve a Carved Pumpkin for Halloween", May 26, 2015, https://www.clorox.com/how-to/hacks-crafts-diy/surprising-uses-for-clorox/how-to-preserve-a-carved-pumpkin/, printed 4 pages in all.

* cited by examiner

*Primary Examiner* — Helen F Heggestad
(74) *Attorney, Agent, or Firm* — Brian H. Floyd

(57) ABSTRACT

Methods for inhibiting mold growth and for inhibiting mold growth on jack-o'-lanterns are presented herein. Applying a pepper based coating to exposed surfaces can reduce and/or hinder mold growth. This concept may advantageously find use in preserving jack-o'-lanterns. In general this idea may be applied to preserving foods and to inhibiting mold growth on surfaces of objects.

6 Claims, 7 Drawing Sheets

METHODS FOR INHIBITING MOLD GROWTH

CROSS-REFERENCE TO RELATED APPLICATION

This application claims the benefit under 35 U.S.C. § 119(e) of U.S. Provisional Application No. 62/487,479, filed Apr. 20, 2017, entitled "METHODS AND APPARATUS FOR REDUCING MOLD GROWTH," the entirety of which is hereby incorporated by reference.

BACKGROUND

Field

Embodiments of the invention relate to mold inhibitors and their application, and more particularly, to methods for preserving carved pumpkins.

Description of the Related Science

The carved Halloween pumpkin, sometimes referred to as a jack-o'-lantern, can be both fun and problematic. Within days, sometimes hours, after carving the pumpkin, it can begin to mold and deteriorate. Eventually it may collapse or implode due to the mold growth.

Mold and mold spores are everywhere, and mold can be killed with some chemicals; however, chemicals can be toxic and bad for the environment and pets.

SUMMARY

In one aspect a method of preparing a mold inhibitor comprises: obtaining a first quantity of pepper; obtaining a second quantity of liquid; and mixing the first quantity of pepper with the second quantity of liquid. The mold inhibitor is applied to surfaces of a carved squash.

The second quantity of liquid can comprise water. The second quantity of liquid can comprise vinegar. The second quantity of liquid can comprise cayenne pepper. The first quantity of pepper can comprise at least one tablespoon of ground pepper. The first quantity of pepper can comprise whole cayenne pepper. The second quantity of liquid can be greater than or equal to the first quantity of pepper. The second quantity of liquid can be less than the first quantity of the pepper.

In another aspect a method of inhibiting mold growth on a surface comprises: preparing the surface of an object for application of a mold inhibitor; obtaining the mold inhibitor, the mold inhibitor comprising at least one part pepper; and applying the mold inhibitor to the surface.

The mold inhibitor can comprise at least one part vinegar. The mold inhibitor can comprise at least one part water. The object can comprise a fruit. The object can comprise a vegetable.

Preparing the surface of the object for application of the mold inhibitor can further comprise carving a pumpkin to expose an inside surface of the pumpkin.

A method of preserving a jack-o'-lantern comprises: carving a pumpkin into the jack-o'-lantern; preparing an exposed inside surface of the jack-o'-lantern for application of a mold inhibitor comprising pepper; and applying the mold inhibitor to the surface.

Applying the mold inhibitor to the exposed inside surface can further comprise rubbing the mold inhibitor on the exposed inside surface.

Applying the mold inhibitor to the exposed inside surface can further comprise spraying the mold inhibitor to the exposed inside surface.

The mold inhibitor can comprise vinegar. The mold inhibitor can comprise a liquid. The mold inhibitor can comprise TABASCO® sauce.

BRIEF DESCRIPTION OF THE DRAWINGS

These drawings and the associated description herein are provided to illustrate specific embodiments of methods for inhibiting mold growth and are not intended to be limiting.

DETAILED DESCRIPTION OF EMBODIMENTS

Figure 1A:
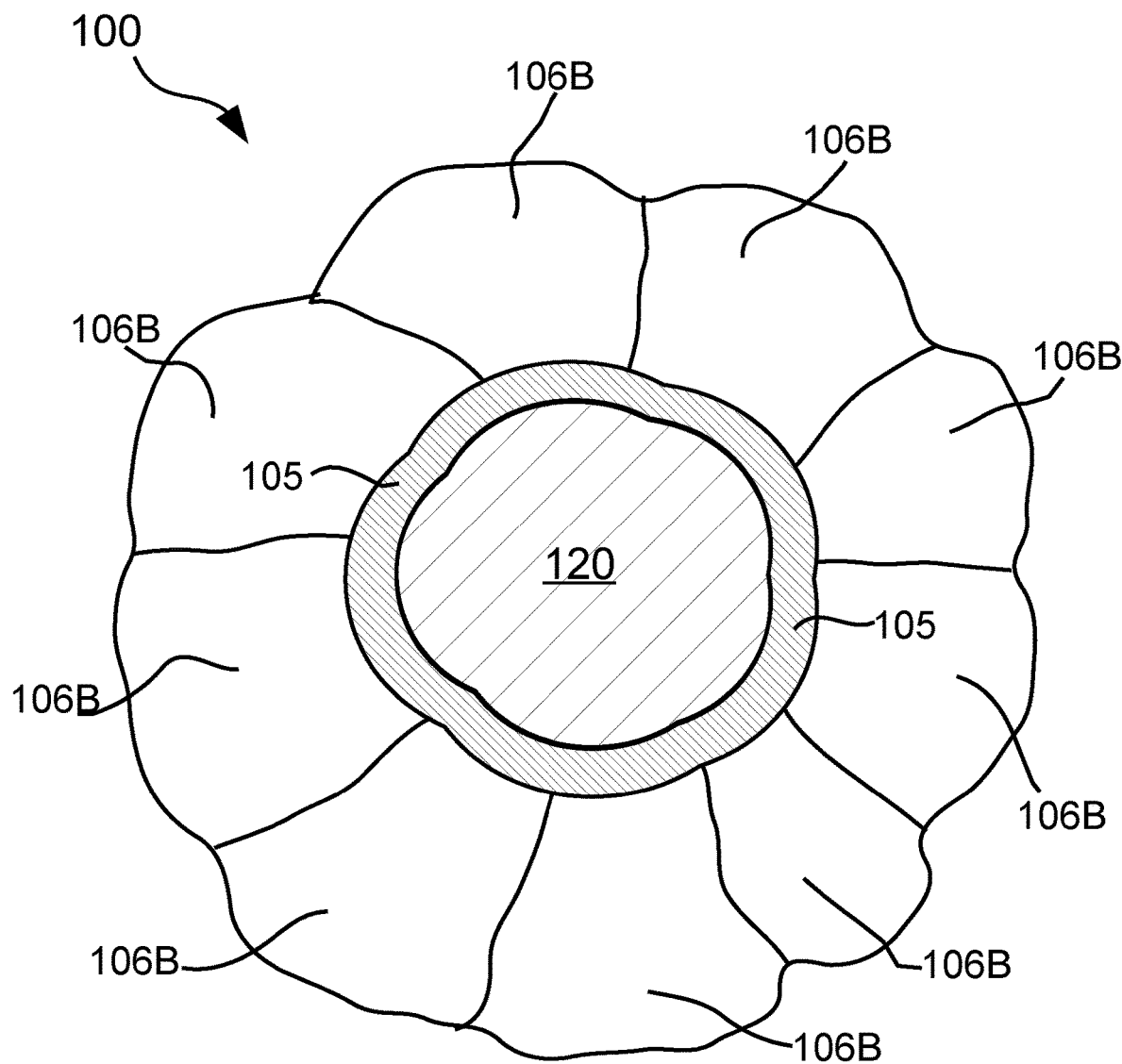
FIG. 1A shows a top view perspective of a carved pumpkin prepared for preserving with an inhibitor according to an embodiment.

The following detailed description of embodiments presents various descriptions of specific embodiments methods for inhibiting mold growth and preserving jack-o'-lanterns. However, the invention can be embodied in a multitude of different ways as defined and covered by the claims. Also, the methods for inhibiting mold growth can generally be applied to preventing mold growth and/or other forms of living organisms from deteriorating fruits and vegetables. In this description, reference is made to the drawings in which like reference numerals may indicate identical or functionally similar elements.

Even though mold can sometimes be very unpleasant, it is actually all around us in the air. Mold is a type of microscopic fungus; it is a living organism. It can be observed as macroscopic spots on food. It is sometimes dangerous; even though one type of mold can cure sickness, the type growing on your food may make you sick. Thus, there is an interest in performing experiments to discover how mold grows on food and to learn how to inhibit mold. The disclosure herein is based, at least in part, on experimental research performed to study how fast mold grows.

The experimental research began with an experimental procedure. The procedure included observing what happens when different types of liquids, such as lemon juice, are used as coatings on different foods. Petri dishes were used to contain select food samples with and without coatings, and daily observations were made for at least thirty days.

One example of a subset of experiments is shown in Table 1. Table 1 presents experimental results of when mold was first observed on samples. Each sample may be a food type with a coating substance and/or without a coating substance. The food types presented in Table 1 include squash, rye bread, and buttermilk bread. The coating (substance) types include vinegar, olive oil, lemon juice, peanut oil, and TABASCO® sauce (TABASCO®). The baseline experiments did not use a coating (substance); also, if no mold was observed, then the table entry is indicated as "None". On the other hand, if mold was observed on a sample, then the day it was first observed is presented.

TABLE 1

Days Until Mold Observed For Different Items Based On The Coating Substance

| | | Coating Substance | | | | |
|---|---|---|---|---|---|---|
| Item | Baseline | Vinegar | Olive Oil | Lemon Juice | Peanut Oil | TABASCO ® |
| Squash | Day 6 | Day 22 | Day 4 | Day 3 | Day 4 | None |
| Rye Bread | Day 8 | None | None | None | None | None |
| Buttermilk Bread | Day 6 | None | None | None | None | None |

Initially, it was hypothesized that lemon juice and/or vinegar may be better coatings (coating substances) for reducing the rate of mold growth, (i.e., for inhibiting mold growth). Some of the coating substances including TABASCO® sauce were initially selected because there were extra Petri dishes; however, experimental priority was initially biased towards the hypothesized coating substances (e.g., lemon juice and/or vinegar).

An unexpected discovery, as revealed in Table 1, was that no mold (i.e., "None") was observed on the squash sample coated with TABASCO® sauce. TABASCO® is a trademark of Mcilhenny Company located on Avery Island, La.

On Halloween carved pumpkins, a form of squash, may be used to make jack-o'-lanterns. Jack-o'-lanterns have exposed inside surfaces vulnerable to deterioration and to mold. Thus, within a few days a jack-o'-lantern may deteriorate and require disposal. However, one may wish to carve a jack-o'-lantern several days or weeks before Halloween and/or keep the jack-o'-lantern (carved pumpkin) after Halloween. While there may be ways to preserve a jack-o'-lantern with chemicals, this can be environmentally unfriendly, Accordingly, there is a need to find an environmentally friendly way to preserve a jack-o'-lantern.

Methods for inhibiting mold growth and for inhibiting mold growth on jack-o'-lanterns are presented herein. Applying a pepper based coating to exposed surfaces can reduce and/or hinder mold growth. This concept may advantageously find use in preserving jack-o'-lanterns. In general this idea may be applied to preserving foods and to inhibiting mold growth on surfaces of objects.

Figure 1B:
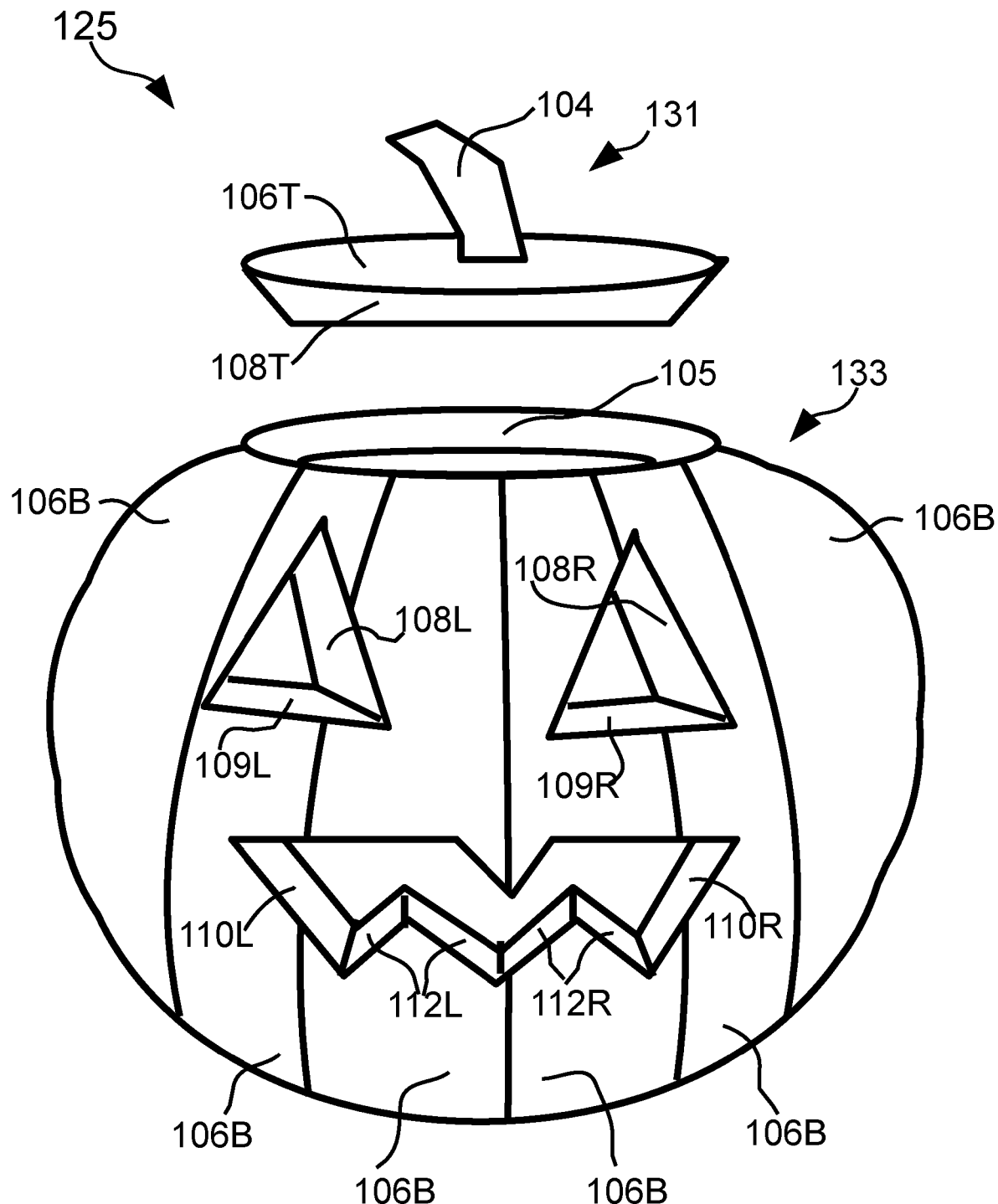
FIG. 1B shows a side view perspective of a carved pumpkin prepared for preserving with an inhibitor according to an embodiment.

FIG. 1A shows a top view perspective 100 of a carved pumpkin prepared for preserving with an inhibitor according to an embodiment; and FIG. 1B shows a side view perspective 125 of the carved pumpkin prepared for preserving with an inhibitor according to an embodiment. The top view perspective 100 shows the outside surface 106B, an inside top surface 105, and the bottom surface 120. The side view perspective 125 illustrates separate carved bottom portion 133 and top portion 131 of the pumpkin (jack-o'-lantern). In addition to illustrating the inside top surface 105, the carved bottom portion 133 further illustrates the outside surface 106B with carved left and right interior eye surfaces 108L, 109L, 108R, 109R. Also, shown are left and right interior mouth surfaces 110L, 112L, 112R, and 110R. The carved top portion 131 has an outside surface 106T, a stem 104, and an inside surface 108T. One of ordinary skill in the art may recognize FIGS. 1A-B as a simple jack-o'-lantern carving and may appreciate that other jack-o'-lantern carvings are possible. For instance, a jack-o'-lantern may be carved in other forms to include various artistic shapes such as an animals, objects, and the like.

Surfaces especially vulnerable to mold and deterioration can be the inside surfaces which become exposed upon carving. With reference to FIG. 1A and FIG. 1B, inside surfaces may include, but not be limited to, the inside top surface 105, the bottom surface 120, the inside surface 108T, the left and right interior eye surfaces 108L, 108R, 109L, 109R, and the left and right interior mouth surfaces 110L, 110R, 112L, 112R; however, as one of ordinary skill in the art of Halloween jack-o'-lanterns may appreciate, other surfaces not shown in FIG. 1A may also be exposed and vulnerable to mold and/or deterioration.

According to the teachings herein, vulnerable exposed surfaces may be preserved by applying a mold inhibiting coating (i.e., a coating substance). The mold inhibiting substance may include pepper, ground pepper, and/or a liquid. The pepper can be ground cayenne for instance, and the liquid can be vinegar. However, in other embodiments the coating substance may be just pepper. In some embodiments the liquid can be water.

Figure 2:
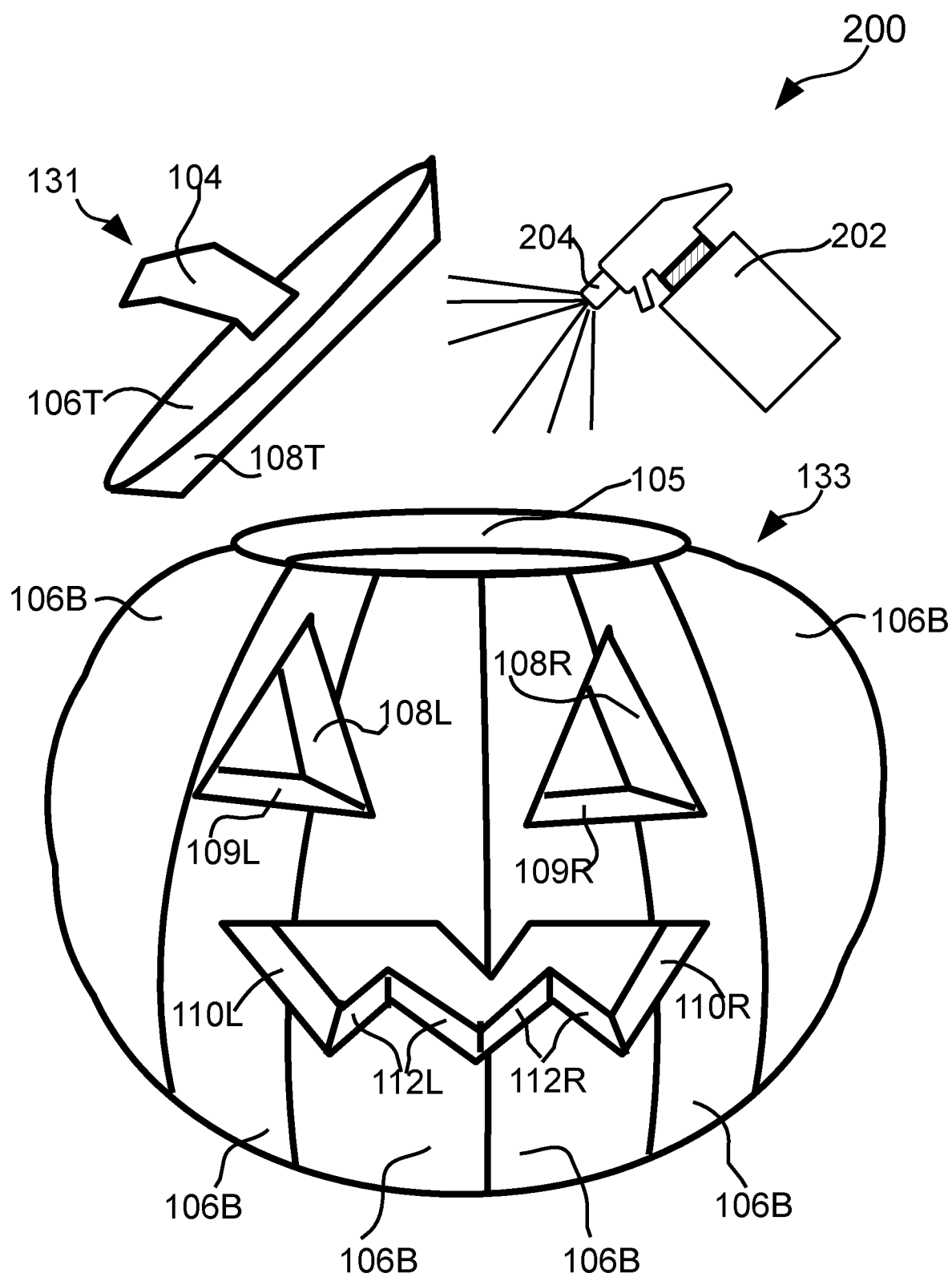
FIG. 2 shows a side view perspective of applying a mold inhibitor to preserve a carved pumpkin according to an embodiment.

FIG. 2 shows a side view perspective 200 of applying a mold inhibitor to preserve a carved pumpkin according to an embodiment. FIG. 2 shows a spray bottle 202 with a spray nozzle 204 for applying a coating of mold inhibitor to surfaces of the carved top portion 131 and carved the bottom portion 133. The spray can be applied to interior surfaces including the inside top surface 105, the bottom surface 120, the inside surface 108T, the left and right interior eye surfaces 108L, 108R, 109L, 109R, and the left and right interior mouth surfaces 110L, 110R, 112L, 112R. In some embodiments the spray can also be applied to outside surfaces including, but not limited to, outside surfaces 106T, 106B, and the stem 104.

When the mold inhibitor comprises a pepper, pepper extract, crushed pepper, and/or a ground pepper, the mold inhibitor may advantageously preserve the surfaces of the jack-o'lantern and inhibit mold growth. Additionally, the color of the mold inhibitor may advantageously enhance the decorative value of the jack-o'-lantern. For instance, cayenne pepper may be applied to inhibit mold and to provide a red color consistent with Halloween decor. In the teachings herein, pepper may also refer to other forms of pepper including "pepper extract", "crushed pepper", "ground pepper", and the like. Additionally, pepper may also include different varieties of pepper including, but not limited to, "black pepper", "cayenne pepper", "habanero pepper", and the like.

Figure 3A:
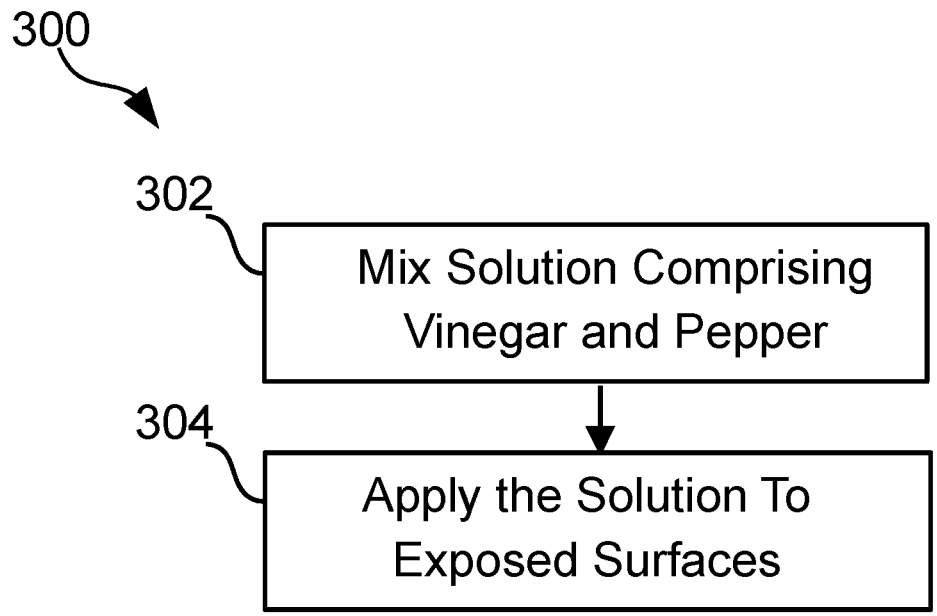
FIG. 3A illustrates a flow diagram for applying a mold inhibitor according to an embodiment.

FIG. 3A illustrates a flow diagram 300 for applying a mold inhibitor according to an embodiment. In step 302 a solution comprising vinegar and pepper may be mixed together. In some embodiments more vinegar may be used than pepper. In other embodiments less vinegar may be used than pepper. The amounts of pepper and or vinegar can be referred to in terms of "quantity" and/or in terms of "parts". For instance, in some embodiments one part vinegar may be added with one part pepper (e.g., ground cayenne pepper). In step 304 the solution may be applied to exposed surfaces such as exposed inside surfaces of a jack-o'-lantern. The solution may be applied with a spray bottle 202 and spray nozzle 204; alternatively, and additionally the solution may be applied by immersing the object (e.g. jack-o'-lantern)

into the solution, rubbing the solution onto the object, by using a brush, by using a cloth, by using hands, and the like.

Figure 3B:
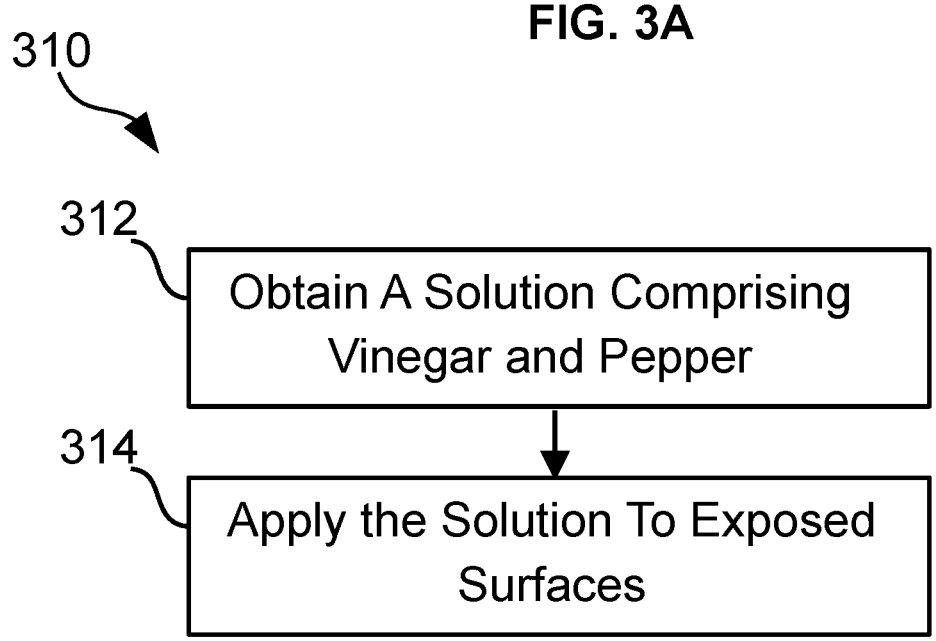
FIG. 3B illustrates a flow diagram for applying a mold inhibitor according to an embodiment.

FIG. 3B illustrates a flow diagram 310 for applying a mold inhibitor according to an embodiment. In step 312 one may obtain a solution comprising vinegar and pepper; and in step 314 the solution may be applied using approaches similar to that discussed with regards to step 304.

Figure 3C:
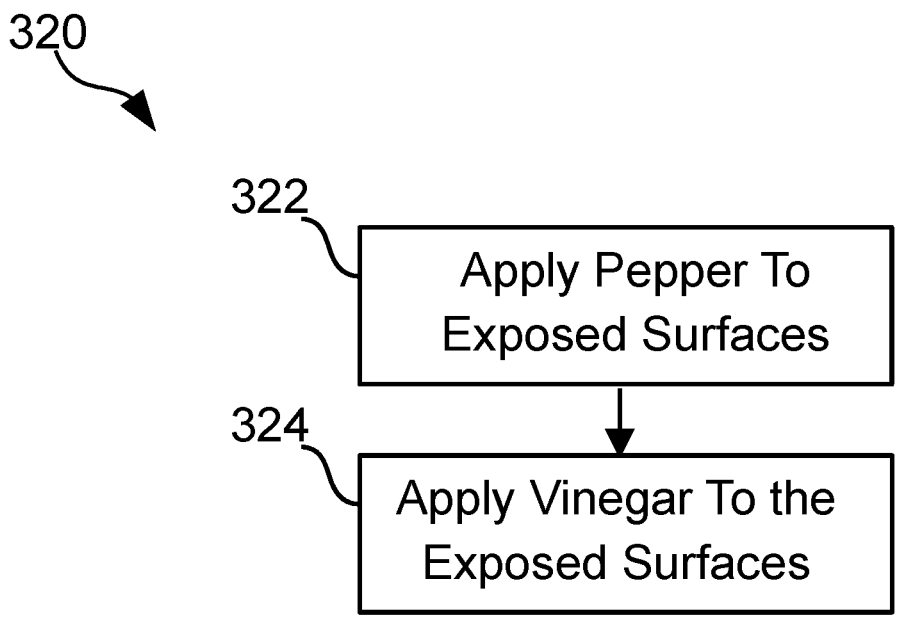
FIG. 3C illustrates a flow diagram for applying a mold inhibitor according to an embodiment.

FIG. 3C illustrates a flow diagram 320 for applying a mold inhibitor according to an embodiment. In step 322 pepper may be applied to the exposed surfaces. For instance, ground pepper may be rubbed onto inside (interior) surfaces including the inside top surface 105, the bottom surface 120, the inside surface 108T, the left and right interior eye surfaces 108L, 108R, 109L, 109R, and the left and right interior mouth surfaces 110L, 110R, 112L, 112R. Following this step is an optional step 324 for applying vinegar. In some embodiments just step 322 may suffice to inhibit mold and to preserve a jack-o'-lantern.

Figure 3D:
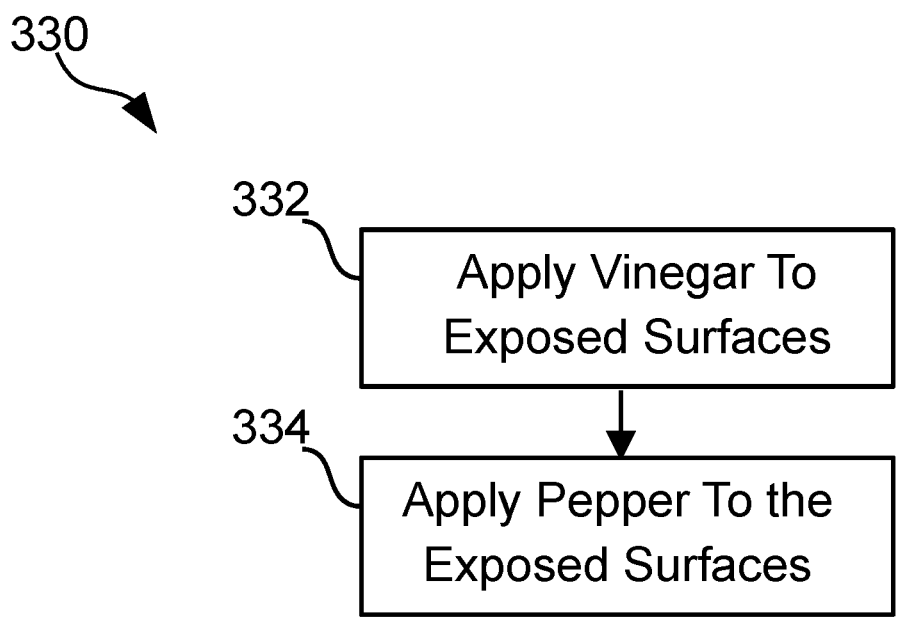
FIG. 3D illustrates a flow diagram for applying a mold inhibitor according to an embodiment.

FIG. 3D illustrates a flow diagram 330 for applying a mold inhibitor according to an embodiment. In step 332 vinegar may be applied and in subsequent step 334 pepper may be applied.

Figure 4A:
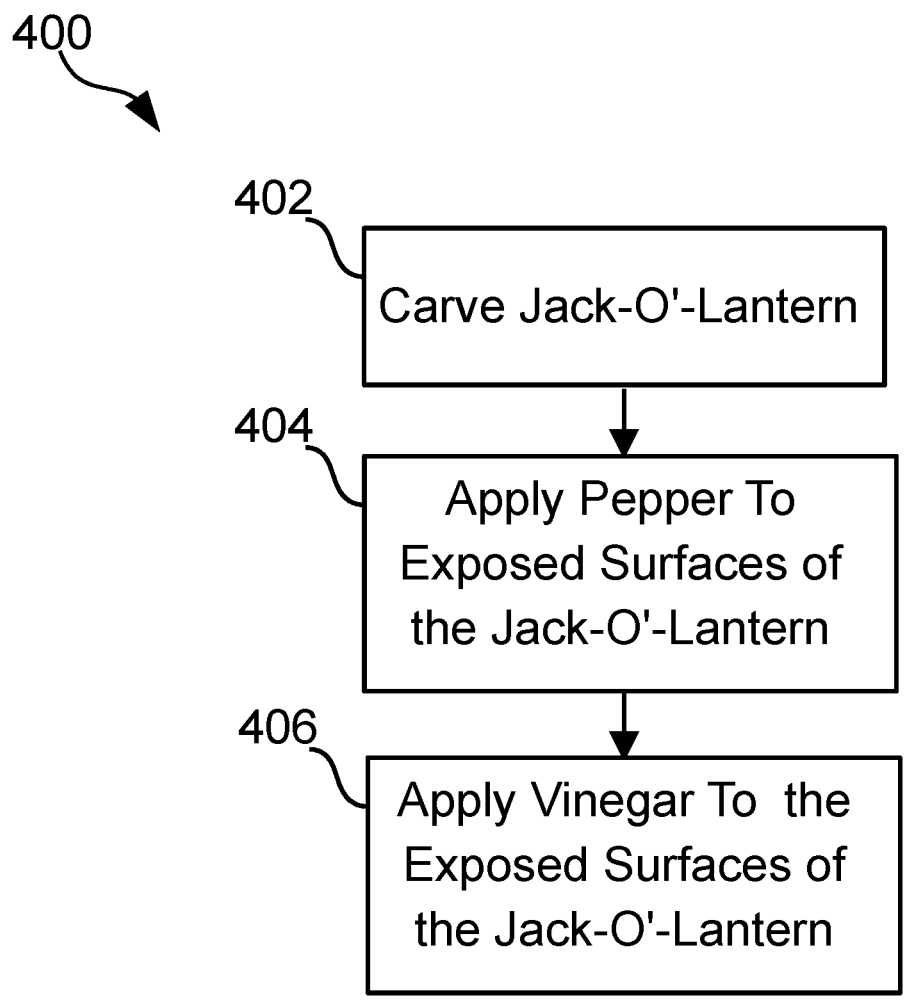
FIG. 4A illustrates a flow diagram for preparing and preserving a jack-o'-lantern according to an embodiment.
Figure 4B:
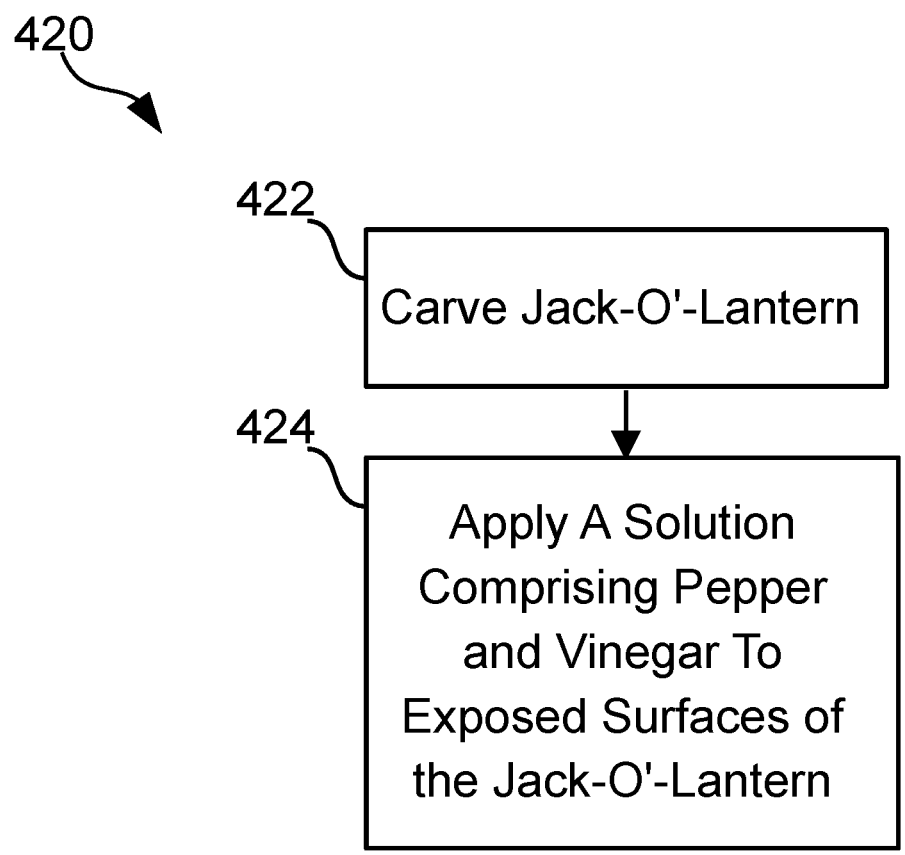
FIG. 4B illustrates a flow diagram for preparing and preserving a jack-o'-lantern according to another embodiment.

FIG. 4A illustrates a flow diagram 400 for preparing and preserving a jack-o'-lantern according to an embodiment. The first step 402 can be to carve the jack-o'-lantern. In step 404 pepper may be applied to exposed vulnerable surfaces and/or exterior surfaces. In step 406 vinegar may be subsequently applied as an optional step. FIG. 4B illustrates a flow diagram 420 for preparing and preserving a jack-o'-lantern according to another embodiment. In step 422 the jack-o'-lantern is carved and then in step 424 a solution (i.e., coating) comprising pepper and vinegar is applied to surfaces of the jack-o'-lantern. The solution may be prepared in advance and/or be a commercially available solution (e.g., hot sauce). In some embodiments, the solution can be TABASCO® sauce.

Applications

Within the disclosure, the term "coating substance" may also be referred to as a "coating" and/or "solution". A "surface" may refer to a surface vulnerable to deterioration and/or deterioration due to mold growth. Although the disclosure discusses the preservation of jack-o'-lanterns, the methods and coating substances may be applicable to other foods, vegetables fruits, and types of squash.

In some embodiments ways of applying a "coating" may include applying a coating by using a spray aerosol, by using a brush, by using a rubbing approach (e.g. using hands), by using an immersion (dunking) approach, and the like.

Although methods for inhibiting mold growth have been described in terms of certain embodiments relating to jack-o'-lanterns, other embodiments that are apparent to those of ordinary skill in the art, including embodiments that do not provide all of the features and advantages set forth herein, are also within the scope of this disclosure. Moreover, the various embodiments described above can be combined to provide further embodiments. In addition, certain features shown in the context of one embodiment can be incorporated into other embodiments as well. Accordingly, the scope of the present disclosure is defined only by reference to the appended claims.

What is claimed is:

1. A method of applying a coating to inhibit mold growth on a surface of a pumpkin, the method comprising:
    preparing the surface of the pumpkin for application of the coating, wherein preparing the surface comprises carving the pumpkin to expose an inside surface;
    obtaining the coating, the coating comprising one part vinegar to one part cayenne pepper; and
    applying the coating to the surface of the pumpkin, wherein the surface of the pumpkin comprises the inside surface.

2. The method of claim 1, wherein the coating comprises at least one tablespoon of cayenne ground pepper.

3. A method of preparing a jack-o'-lantern, the method comprising:
    carving a pumpkin into the jack-o'-lantern;
    preparing an exposed inside surface of the jack-o'-lantern for application of a coating, the coating comprising one part vinegar to one part pepper; and
    applying the coating to the exposed inside surface.

4. The method of claim 3, wherein applying the coating to the exposed inside surface further comprises:
    rubbing the coating on the exposed inside surface.

5. The method of claim 3, wherein applying the coating to the exposed inside surface further comprises:
    spraying the coating onto the exposed inside surface.

6. The method of claim 3, wherein the coating comprises at least one tablespoon of ground pepper.

\* \* \* \* \*